(12) United States Patent
Spatschek et al.

(10) Patent No.: US 10,962,052 B2
(45) Date of Patent: Mar. 30, 2021

(54) GUIDE RAIL WITH FASTENING HOLES AND HEAT SINK

(71) Applicant: Robert Bosch GmbH, Stuttgart (DE)

(72) Inventors: Gerd Spatschek, Mellrichstadt (DE); Michael Korbacher, Wipfeld (DE); Carsten Pfeuffer, Roethlein (DE); Roland Greubel, Ramsthal (DE); Marius Feuerbach, Schweinfurt (DE)

(73) Assignee: Robert Bosch GmbH, Stuttgart (DE)

( * ) Notice: Subject to any disclaimer, the term of this patent is extended or adjusted under 35 U.S.C. 154(b) by 284 days.

(21) Appl. No.: 16/303,399

(22) PCT Filed: May 9, 2017

(86) PCT No.: PCT/EP2017/060993
§ 371 (c)(1),
(2) Date: Nov. 20, 2018

(87) PCT Pub. No.: WO2017/202599
PCT Pub. Date: Nov. 30, 2017

(65) Prior Publication Data
US 2020/0318682 A1    Oct. 8, 2020

(30) Foreign Application Priority Data
May 24, 2016  (DE) .................. 10 2016 208 916

(51) Int. Cl.
*F16C 29/00* (2006.01)
*F16C 37/00* (2006.01)

(52) U.S. Cl.
CPC .......... *F16C 29/005* (2013.01); *F16C 29/004* (2013.01); *F16C 37/007* (2013.01); *F16C 2226/60* (2013.01)

(58) Field of Classification Search
CPC ..... F16C 29/004; F16C 29/005; F16C 37/007
See application file for complete search history.

(56) References Cited

U.S. PATENT DOCUMENTS

| 5,431,497 A | 7/1995 | Nonaka |
| 10,520,018 B2 * | 12/2019 | Ament ................. F16C 37/007 |
| 2008/0193064 A1 | 8/2008 | Roders |

FOREIGN PATENT DOCUMENTS

| CN | 203214611 U | 9/2013 |
| DE | 198 50 626 A1 | 5/2000 |

(Continued)

OTHER PUBLICATIONS

International Search Report corresponding to PCT Application No. PCT/EP2017/060993, dated Aug. 23, 2017 (German and English language document) (6 pages).

*Primary Examiner* — James Pilkington
(74) *Attorney, Agent, or Firm* — Maginot, Moore & Beck LLP

(57) ABSTRACT

A guide rail, for use with a guide carriage having at least one row of rolling elements, extends along a longitudinal axis and has at least one running surface for the rolling elements, a separate heat sink, and a plurality of first through holes. The running surface is arranged parallel to the longitudinal axis. The heat sink extends along the longitudinal axis and lies against the guide rail. At least sections of the heat sink delimit a first and a second cooling channel that each extend along the longitudinal axis. The first through holes are distributed along the longitudinal axis and are configured to receive screw-bolts. The heat sink has a plurality of second through holes, each aligning with and continuing an associated first through hole. The first and second cooling channels are located on opposite sides of the plurality of second through holes.

11 Claims, 4 Drawing Sheets

(56) References Cited

FOREIGN PATENT DOCUMENTS

| | | |
|---|---|---|
| DE | 101 07 255 C1 | 6/2002 |
| DE | 20 2010 016 616 U1 | 3/2011 |
| DE | 10 2014 220 587 A1 | 4/2016 |
| EP | 2 110 571 B1 | 10/2009 |
| JP | 2015-175422 A | 10/2015 |
| WO | wo2017191736 * | 11/2017 |

* cited by examiner

GUIDE RAIL WITH FASTENING HOLES AND HEAT SINK

CROSS REFERENCE TO RELATED APPLICATIONS

This application is a 35 U.S.C. § 371 National Stage Application of PCT/EP2017/060993, filed on May 9, 2017, which claims the benefit of priority to Ser. No. DE 10 2016 208 916.1, filed on May 24, 2016 in Germany, the disclosures of which are incorporated herein by reference in their entirety.

The disclosure concerns a guide rail.

BACKGROUND

DE 10 2014 220 587 A1 describes a guide rail for a linear roller bearing which is provided with a separate heat sink. The heat sink together with the guide rail forms cooling channels through which a cooling fluid is conducted in order to set the temperature of the guide rail to a predefined nominal value. Such guide rails are used for example in machine tools to achieve a high machining accuracy.

SUMMARY

One advantage of the present disclosure is that the guide rail can be attached to a base body by means of separate screw bolts, wherein the guide rail nonetheless deploys a good cooling effect.

It is proposed that the guide rail has a plurality of first through-holes for receiving screw bolts distributed along the longitudinal axis, wherein the heat sink has second through-holes each aligning with and continuing an associated first through-hole, wherein the first and second cooling channels are arranged on opposite sides of the second through-holes.

The guide rail is preferably made of steel. Preferably, the guide rail is hardened at least in the region of the running surfaces. The first and/or second cooling channels are preferably formed as closed channels. They may form the supply and return of a cooling circuit in which a cooling fluid circulates. The fluid may however also flow through these in the same direction. The cooling fluid is preferably a liquid which, highly preferably, contains water and/or oil.

The claims, description, and drawings describe advantageous refinements and improvements of the disclosure.

It may be provided that the heat sink, with the exception of the second through-holes, has a constant cross-sectional form along the longitudinal axis and consists of aluminum. Such a heat sink is particularly economical. The heat sink is preferably made in the extrusion process.

It may be provided that the guide rail has a bottom face through which the first through-holes pass, wherein the heat sink bears against the bottom face. In this way, the heat sink may be clamped between the bottom face and the base body on which the guide rail is mounted, so that the heat transfer between the heat sink and the guide rail is particularly good.

It may be provided that in the region of the first through-holes, the bottom face is formed by a first groove extending along the longitudinal axis, wherein at least portions of the heat sink are received in the first groove. Such a guide rail takes up particularly little space. In particular, it may be configured with the same dimensions as an uncooled guide rail. Preferably, the heat sink is received completely in the first groove.

It may be provided that the bottom face delimits at least portions of the first and second cooling channel. In this way, the cooling fluid comes into direct contact with the guide rail so that the heat transfer between the guide rail and the cooling fluid is particularly good. Preferably, the first groove delimits at least portions of both the first and the second cooling channels.

It may be provided that, viewed in cross-section, the heat sink has a center piece from which two opposing wings protrude transversely to the longitudinal axis, wherein the second through-holes pass through the center piece, wherein the wings delimit at least portions of the first or second cooling channel. This embodiment is particularly space-saving. Preferably, a seal is arranged between the wings and the first groove. Preferably, at least one seal is arranged between the base and the first groove.

It may be provided that the first and second cooling channels are delimited exclusively by the heat sink. The cooling channels may thus be formed particularly tightly sealed. No escape of cooling fluid is to be feared. The heat sink is preferably configured as one piece.

It may be provided that the heat sink is connected to the guide rail by substance bonding. This securely prevents the heat sink from becoming detached from the guide rail, in particular if the guide rail is not mounted on the assigned base body. Preferably, the heat sink is connected to the first groove by substance bonding. Said substance bonding may be achieved by gluing, soldering or welding.

It may be provided that the guide rail has at least one end face oriented perpendicularly to the longitudinal axis, wherein a second groove is arranged in the end face and connects an assigned fluid port to the first and/or second cooling channel. In this way, a connection is created between the cooling channels and the fluid port in a particularly simple and compact fashion. The second groove is preferably covered with a cover, so that together with the cover it forms a closed channel.

The disclosure also describes protection for an assembly comprising a guide rail according to the disclosure and a base body, wherein the guide rail bears against the base body, wherein the first and second through-holes each receive an assigned screw bolt which is screwed into the base body.

It may be provided that the base body has a third groove extending parallel to the longitudinal axis, wherein at least portions of the heat sink are received in the third groove. The third groove is thus arranged in a region of the base body which in any case is subjected to machining by material removal. It may therefore be produced at low cost. The heat sink may be received completely in the third groove, wherein no second groove is provided on the guide rail.

It is understood that the features cited above and explained below may be used not only in the combination given but also in other combinations or alone without leaving the scope of the present disclosure.

BRIEF DESCRIPTION OF THE DRAWINGS

The disclosure is described below in more detail with reference to the attached drawings. The drawings show.

DETAILED DESCRIPTION

Figure 1:
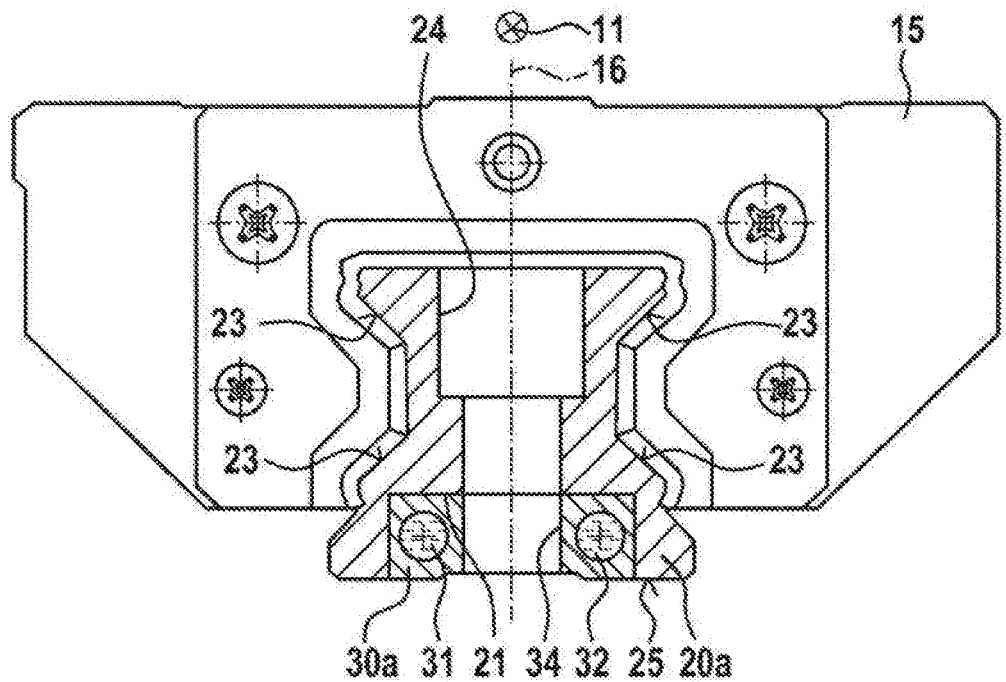
FIG. 1 a cross-section of a guide rail according to a first embodiment of the disclosure.

FIG. 1 shows a cross-section of a guide rail 20a according to a first embodiment of the disclosure. The section plane of FIG. 1 runs perpendicularly to the longitudinal axis 11 and through the center axis of a first through-hole 24. A guide carriage 15 is mounted on the guide rail 20a and may be formed for example as described in EP 2 110 571 B1. The guide carriage 15 in the present case has four rows of endlessly circulating rolling elements which each roll on an assigned running surface 23 on the guide rail 20a. The guide rail 20a consists of steel, wherein it is preferably surface-hardened in the induction process. The guide rail 20a has a plurality of first through-holes 24 formed as stepped bores. The first through-holes 24 are regularly distributed, parallel to each other, along the longitudinal axis 11. The first through-holes 24 are configured to receive screw bolts in the form of cheese-head bolts. They pass through a bottom face 25 at the bottom of the guide rail 20a, which also serves as a support face for a base body (see FIG. 7). The guide rail 20a and the guide carriage 15 are formed so as to be mirror-symmetrical relative to a plane of symmetry 16 running parallel to the longitudinal axis 11.

The bottom face 25 is formed in portions by a first groove 21 which extends with a constant cross-sectional form, rectangular in the present case, along the longitudinal axis 11. The first groove 21 extends over the entire length of the guide rail 20a, wherein if desired it is closed at both ends lying opposite each other in the direction of the longitudinal axis. The first groove 21 receives a heat sink 30a. The heat sink 30a is adapted to the first groove 21 such that the contact surface between the heat sink 30a and the guide rail 20a is maximal. Preferably, the heat sink 30a is fitted in the first groove 21 with a slight preload. It is also conceivable that a heat-conduction paste is applied between the heat sink 30a and the guide rail 20a. The heat sink 30a has a plurality of second through-holes 34 which each align with and continue an associated first through-hole 24, such that the respective screw bolt can be pushed through the first and second through-holes 24; 34.

A first and a second cooling channel 31; 32 are arranged to the left and right of the second screw holes 34. The first and second cooling channels 31; 32 are formed round when viewed in cross-section, wherein the heat sink 30a completely delimits said cooling channels 31; 32. The corresponding diameter is selected sufficiently large that the remaining wall thickness of the heat sink 30a is minimized in order to improve the heat transfer to the guide rail. With the exception of the second through-holes 34 and the first and second cooling channels 31; 32, the heat sink 30a fills the first groove 21 completely. The first heat sink 30a is preferably made in the milling process. The cross-sectional form of the heat sink 30, with the exception of the second through-holes 34, is constant along the longitudinal axis 11. The heat sink 30a preferably consists of aluminum or copper.

Figure 2:
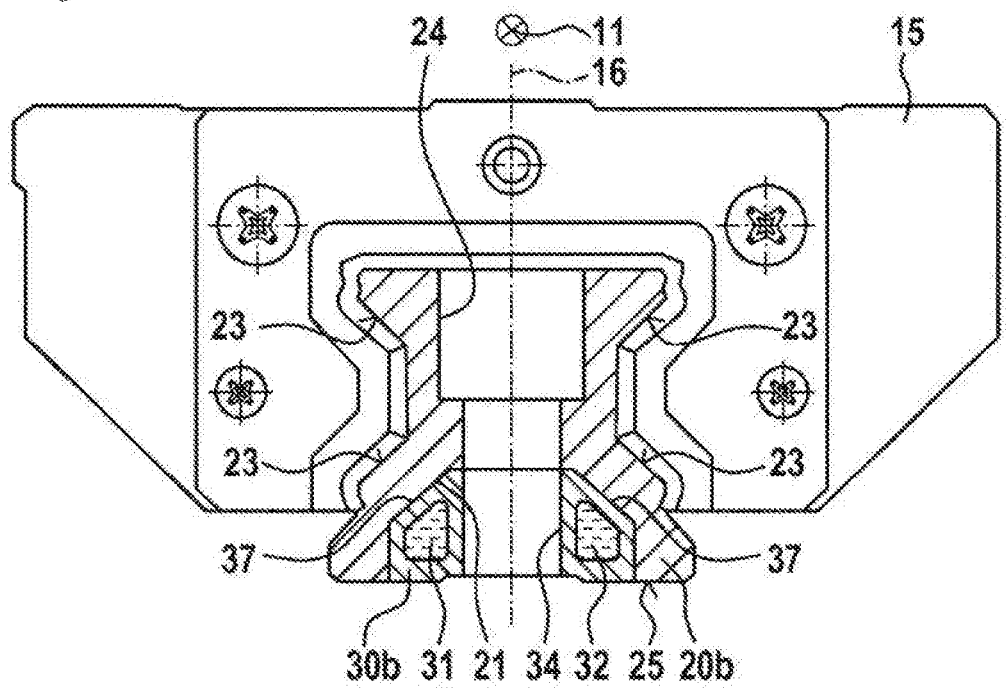
FIG. 2 a cross-section of a guide rail according to a second embodiment of the disclosure.

FIG. 2 shows a cross-section of a guide rail 20b according to a second embodiment of the disclosure. The second embodiment, apart from the differences described below, is identical to the first embodiment so reference is made in this context to the statements relating to FIG. 1. In FIGS. 1 and 2, the same or corresponding parts carry the same reference signs.

The cross-sectional form of the heat sink 30b has been optimized for economic production in the aluminum extrusion process. Accordingly, it has largely constant wall thickness. It is understood that the second through-holes 34 are drilled after extrusion. In comparison with the first embodiment, the height of the heat sink 30b has been increased, wherein the corners of the heat sink 30b have been chamfered in the region of the running surfaces 23. The cross-sectional form of the first groove 21 has been adapted to the modified outer form of the heat sink so as to be substantially play-free and achieve an optimal heat transfer. The cross-sectional form of the first and second cooling channels 31; 32 has been adapted to the outer form of the heat sink so as to give the constant wall thicknesses mentioned above. In this way, firstly a large coolant stream may be conducted through the heat sink 30b. Secondly, little material is required for the heat sink 30b. Also, distortion during extrusion is avoided.

Figure 3:
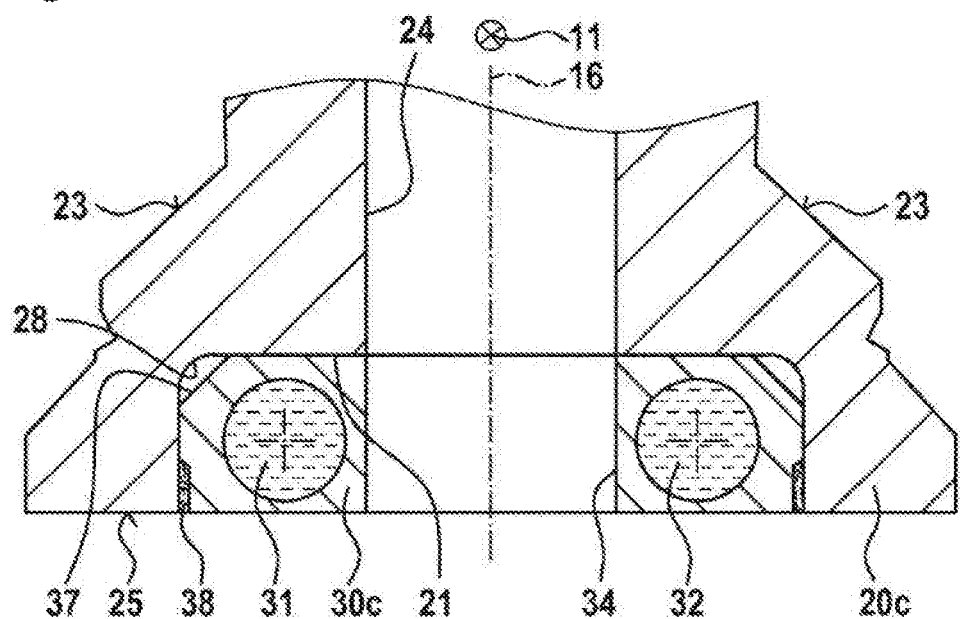
FIG. 3 a partial cross-section of a guide rail according to a third embodiment of the disclosure.

FIG. 3 shows a partial cross-section of a guide rail 20c according to a third embodiment of the disclosure. The third embodiment, apart from the differences described below, is identical to the first embodiment so reference is made in this context to the statements relating to FIG. 1. In FIGS. 1 and 3, the same or corresponding parts carry the same reference signs.

The first groove 21 is formed so as to be rectangular with rounded corners 28, wherein the heat sink 30c is provided with a chamfer 37 in the region of said corners. The heat sink 30c is connected at its opposite side faces to the first groove 21 by substance bonding via an adhesive layer 38. To adjust the thickness and width of the adhesive layer 38, the heat sink 30c is provided with a recess for the adhesive layer 38. On the other side of the adhesive layer 38, the heat sink 30c lies directly on the guide rail 20c.

Figure 4:
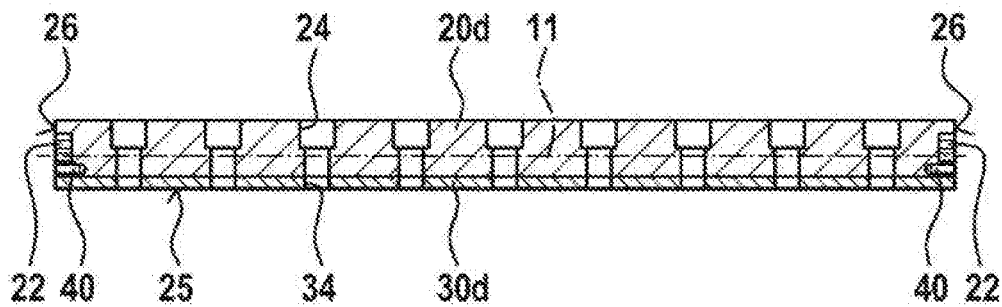
FIG. 4 a longitudinal section of a guide rail according to a fourth embodiment of the disclosure.

FIG. 4 shows a longitudinal section of a guide rail 20d according to a fourth embodiment of the disclosure. The fourth embodiment, apart from the differences described below, is identical to the first embodiment so reference is made in this context to the statements relating to FIG. 1. In FIGS. 1; 4,; 5 and 6, the same or corresponding parts carry the same reference signs.

The first and second through-holes 24; 34, which are evenly distributed along the longitudinal axis 11, can be clearly seen. The heat sink 30d extends over the entire length of the guide rail 20d. The guide rail 20d has two opposite, flat, end faces 26 oriented perpendicularly to the longitudinal axis. The statements above also apply to the first to third embodiments.

Figure 5:
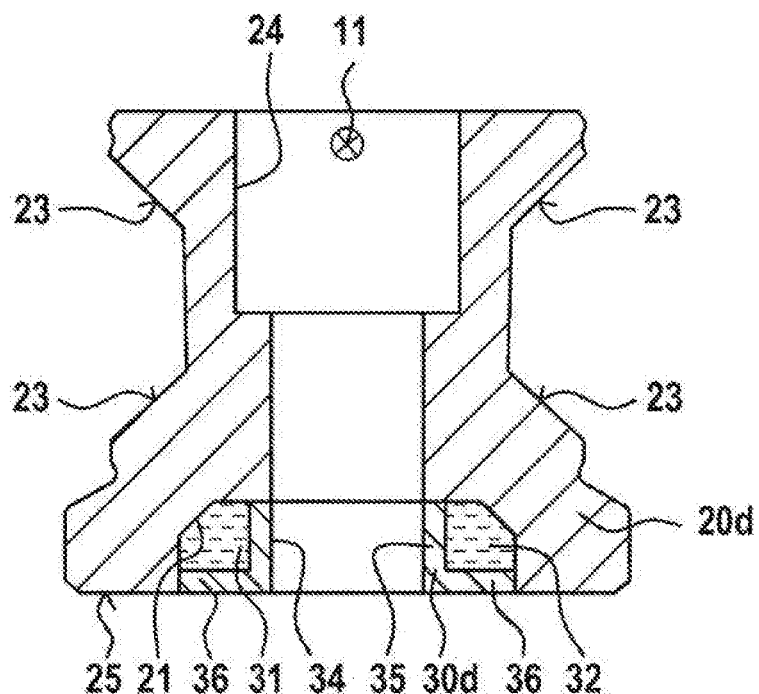
FIG. 5 a cross-section of the guide rail according to FIG. 4.

FIG. 5 shows a cross-section of the guide rail according to FIG. 4. In contrast to the first to third embodiments, the first and second cooling channels 31, 32 are each jointly delimited by the heat sink 30d and by the guide rail 20d. This improves the heat transfer from the cooling fluid in the cooling channels 31; 32 to the guide rail 20d.

The heat sink 30d has a center piece 35 through which the second through-holes 34 pass. To the left and right of the center piece 35, wings 36 protrude which delimit an assigned cooling channel 31; 32. The wings 36 are each formed as a flat plate with constant thickness. The heat sink 30d as a whole has the form of an inverted letter T. Seals (reference sign 41 in FIG. 6) may be arranged between the heat sink 30d and the guide rail 20d in order to prevent the escape of cooling fluid. The first groove 21 is formed rectangular with chamfered corners, wherein the corners may also be formed sharp-edged or rounded.

Figure 6:
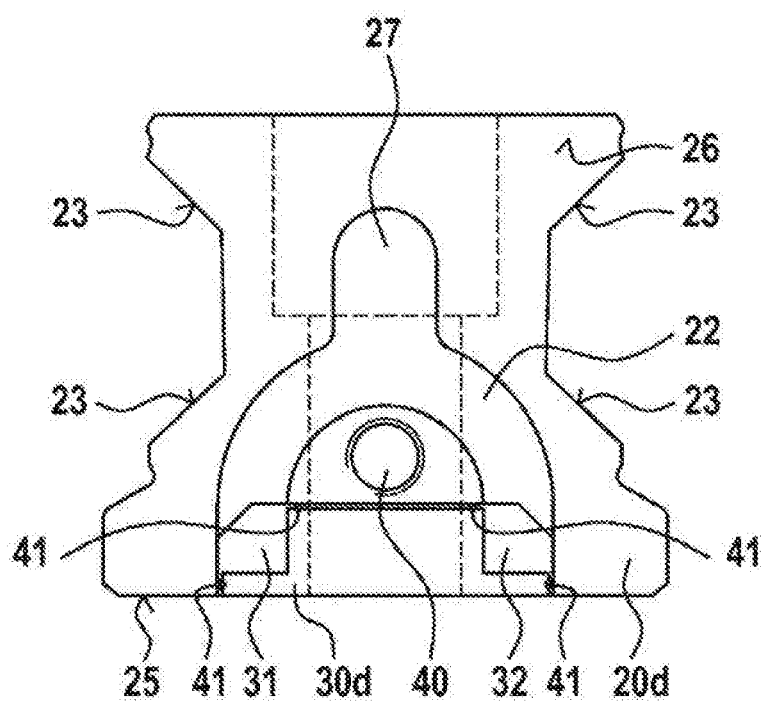
FIG. 6 a side view of the guide rail according to FIG. 4.

FIG. 6 shows a side view of the guide rail 20d according to FIG. 4. The viewing plane is oriented parallel to the end face 26, wherein the cover present there has been removed. A second groove 22, which branches in a fork-shape to the first and second cooling channels 31; 32, is arranged in the end face 26. The second groove is covered fluid-tightly by said cover (not shown), wherein the cover is screwed to the threaded bore 40. A fluid port is provided in the cover, via which cooling fluid may be conducted to the second groove 22 and also to the first and second cooling channels 31; 32. The second groove 22 has a constant depth and a substantially rectangular cross-sectional form.

In the embodiment shown in FIG. 6, fluid flows through both cooling channels 31; 32 in the same direction. It is however also conceivable that the system may be alternatively operated so that-fluid flows through the first and second cooling channels 31; 32 in opposite directions. It is understood that the course of the second groove 22 should be adapted accordingly.

Figure 7:
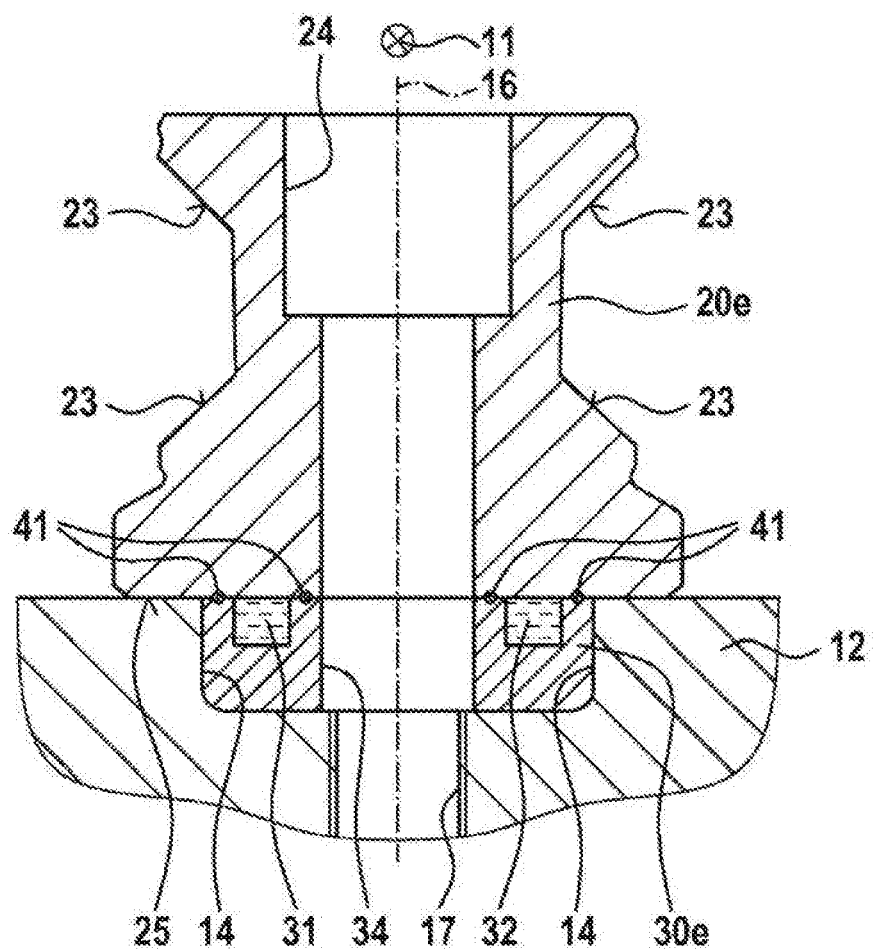
FIG. 7 a cross-section of a guide rail according to a fifth embodiment of the disclosure.

FIG. 7 shows a cross-section of a guide rail 20e according to a fifth embodiment of the disclosure. The fifth embodiment, apart from the differences described below, is identical to the first embodiment so reference is made in this context to the statements relating to FIG. 1. In FIGS. 1 and 7, the same or corresponding parts carry the same reference signs.

Instead of the first groove in the guide rail, now a third groove 14 is provided in the base body 12 to which the guide rail 20e is screwed. The width of the third groove 14 is smaller than the width of the guide rail 20e so that the guide rail 20e bears against the base body 12. A threaded bore 17 is provided in the base body 12, and a screw bolt (not shown) in the form of a cheese-head bolt is screwed into said bore. The screw bolt passes through the first and second through-holes 24; 34. The base body 12 is formed for example by the machine bed of a machine-tool.

The first and second cooling channels 31; 32 are each formed as a groove which is covered fluid-tightly by the guide rail 20e. The cross-sectional form of said groove is rectangular, wherein other cross-sectional forms may also be used. A seal 41 is provided between the heat sink 30e and the guide rail 20e on both sides next to the groove, in order to prevent the emergence of cooling fluid there.

It is understood that the first and the fifth embodiments may also be combined with each other such that both the first and the third grooves are present, wherein the heat sink is received in both the first and third grooves.

LIST OF REFERENCE SIGNS

10 Assembly
11 Longitudinal axis
12 Base body
14 Third groove
15 Guide carriage
16 Plane of symmetry
17 Threaded bore
20a Guide rail (first embodiment)
20b Guide rail (second embodiment)
20c Guide rail (third embodiment)
20d Guide rail (fourth embodiment)
20e Guide rail (fifth embodiment)
21 First groove
22 Second groove
23 Running face
24 First through-hole
25 Bottom face
26 End face
28 Rounded corner
30a Heat sink (first embodiment)
30b Heat sink (second embodiment)
30c Heat sink (third embodiment)
30d Heat sink (fourth embodiment)
30e Heat sink (fifth embodiment)
31 First cooling channel
32 Second cooling channel
34 Second through-hole
35 Center piece
36 Wing
37 Chamfer
38 Adhesive layer
40 Threaded bore
41 Seal

The invention claimed is:

1. A guide rail for use with a guide carriage with at least one row of rolling elements, the guide rail comprising:
at least one running surface for the at least one row of rolling elements, wherein:
the guide rail extends along a longitudinal axis;
the at least one running surface is arranged parallel to the longitudinal axis; and
a plurality of first through-holes are distributed along the longitudinal axis for receiving screw bolts; and
a separate heat sink that extends along the longitudinal axis and bears against the guide rail, wherein:
at least portions of the heat sink delimit a first cooling channel and a second cooling channel;
the first cooling channel and the second cooling channel extend along the longitudinal axis;
the heat sink includes a plurality of second through-holes, each of the plurality of second through-holes aligning with and continuing an associated one of the plurality of first through-holes; and
the first cooling channel and the second cooling channel are arranged on opposite sides of the plurality of second through-holes.

2. The guide rail as claimed in claim 1, wherein:
the heat sink, with the exception of the plurality of second through-holes, has a constant cross-sectional form along the longitudinal axis; and
the heat sink consists of aluminum.

3. The guide rail as claimed in claim 1, wherein:
the guide rail further includes a bottom face;
the plurality of first through-holes pass through the bottom face; and
the heat sink bears against the bottom face.

4. The guide rail as claimed in claim 3, wherein:
the guide rail further includes a first groove extending along the longitudinal axis;
in a region of the plurality of first through-holes, the bottom face is formed by the first groove; and
the portions of the heat sink that delimit the first cooling channel and the second cooling channel are received in the first groove.

5. The guide rail as claimed in claim 4, wherein:
viewed in cross-section, the heat sink further includes:
a center piece; and
two opposing wings that protrude from the center piece transversely to the longitudinal axis;
the plurality of second through-holes pass through the center piece; and
the two wings delimit at least portions of the first cooling channel or portions of the second cooling channel.

6. The guide rail as claimed in claim 3, wherein the bottom face delimits at least portions of the first cooling channel and the second cooling channel.

7. The guide rail as claimed in claim 1, wherein the first cooling channel and the second cooling channel are delimited exclusively by the heat sink.

8. The guide rail as claimed in claim 1, wherein the heat sink is connected to the guide rail by substance bonding.

9. The guide rail as claimed in claim 1, wherein:
the guide rail further includes:
at least one end face oriented perpendicularly to the longitudinal axis; and
a groove in the at least one end face; and
the groove is in fluid communication with at least one of the first cooling channel and the second cooling channel.

10. An assembly comprising:
a guide rail for use with a guide carriage with at least one row of rolling elements, the guide rail including:
at least one running surface for the at least one row of rolling elements, wherein:
the guide rail extends along a longitudinal axis;
the at least one running surface is arranged parallel to the longitudinal axis; and
a plurality of first through-holes are distributed along the longitudinal axis for receiving screw bolts; and
a separate heat sink that extends along the longitudinal axis and bears against the guide rail, wherein:
at least portions of the heat sink delimit a first cooling channel and a second cooling channel;
the first cooling channel and the second cooling channels extend along the longitudinal axis;
the heat sink includes a plurality of second through-holes, each of the plurality of second through-holes aligning with and continuing an associated one of the plurality of first through-holes; and
the first cooling channel and the second cooling channel are arranged on opposite sides of the plurality of second through-holes; and
a base body, wherein:
the guide rail bears against the base body; and
the plurality of first through holes and the plurality of second through-holes each receive an assigned screw bolt that is screwed into the base body.

11. The assembly as claimed in claim 10, wherein:
the base body includes a groove extending parallel to the longitudinal axis; and
at least portions of the heat sink are received in the groove.

* * * * *